US012618724B2

(12) United States Patent
Ogasawara et al.

(10) Patent No.: US 12,618,724 B2
(45) Date of Patent: May 5, 2026

(54) FABRIC-TYPE SENSOR INCLUDING FABRIC BASE MATERIAL AND A LINE-SHAPED SENSOR ELEMENT AND FABRIC-TYPE SENSOR DEVICE

(71) Applicants: DAIKIN FINETECH, LTD., Yamatokoriyama City (JP); SHINDO CO., LTD., Awara City (JP)

(72) Inventors: Ken Ogasawara, Yamatokoriyama City (JP); Satoshi Shimizu, Yamatokoriyama City (JP); Masaaki Sasaki, Awara City (JP); Manabu Nakajima, Awara City (JP); Masahiro Murao, Echi-gun (JP); Ken Miyazaki, Echi-gun (JP)

(73) Assignees: DAIKIN FINETECH, LTD., Yamatokoriyama City (JP); SHINDO CO., LTD., Awara City (JP)

( * ) Notice: Subject to any disclaimer, the term of this patent is extended or adjusted under 35 U.S.C. 154(b) by 348 days.

(21) Appl. No.: 18/274,338

(22) PCT Filed: Feb. 2, 2022

(86) PCT No.: PCT/JP2022/004013
§ 371 (c)(1),
(2) Date: Jul. 26, 2023

(87) PCT Pub. No.: WO2022/181268
PCT Pub. Date: Sep. 1, 2022

(65) Prior Publication Data
US 2024/0085252 A1     Mar. 14, 2024

(30) Foreign Application Priority Data
Feb. 24, 2021    (JP) ................................. 2021-028013

(51) Int. Cl.
*G01L 1/16*     (2006.01)

(52) U.S. Cl.
CPC ...................................... *G01L 1/16* (2013.01)

(58) Field of Classification Search
CPC ........... G01L 1/14; G01L 1/2287; G01L 1/16; H01H 3/142
See application file for complete search history.

(56) References Cited

U.S. PATENT DOCUMENTS

| | | | | | |
|---|---|---|---|---|---|
| 4,080,519 A | * | 3/1978 | Michalson | ............. | H01H 3/142 |
| | | | | | 200/86 R |
| 4,492,949 A | * | 1/1985 | Peterson | ............. | H01H 13/702 |
| | | | | | 338/114 |

(Continued)

FOREIGN PATENT DOCUMENTS

| | | |
|---|---|---|
| CN | 106404065 A | 2/2017 |
| EP | 3848986 A1 | 7/2021 |

(Continued)

OTHER PUBLICATIONS

JP-2002350250_English Translation (Year: 2002).*
International Search Report of PCT/JP2022/004013 dated Mar. 15, 2022 [PCT/ISA/210].

*Primary Examiner* — Tran M. Tran
(74) *Attorney, Agent, or Firm* — Sughrue Mion, PLLC

(57) ABSTRACT

[Problem]
To Provide a fabric-like sensor in which an output signal can be improved when in use and damage or fracture of a sensor element hardly occurs, and a fabric-like sensor device using it.
[Solution]
In a fabric-like sensor S having a fabric base material 1 and a line-shaped sensor element 2, at least one line-shaped cavity portion 11 is provided inside the fabric base material 1, and at least a part of the cavity portion 11 is composed of a raw fabric at least a part of the cavity portion has no elasticity in a line direction of the cavity portion 11, and (Continued)

further the line-shaped sensor element 2 is arranged in a state of not being substantially constrained or fixed in at least one of cavity portions in a fabric 1.

7 Claims, 5 Drawing Sheets

(56)                    References Cited

U.S. PATENT DOCUMENTS

| | | | | |
|---|---|---|---|---|
| 4,555,954 | A * | 12/1985 | Kim | G01L 5/228 |
| | | | | 901/33 |
| 4,866,412 | A * | 9/1989 | Rzepczynski | G06F 3/04144 |
| | | | | 338/114 |
| 5,447,076 | A * | 9/1995 | Ziegler | G01L 1/142 |
| | | | | 73/862.626 |
| 5,799,533 | A * | 9/1998 | Seki | A61B 5/1036 |
| | | | | 73/172 |
| 6,276,121 | B1 * | 8/2001 | Nabeshima | D02G 1/0286 |
| | | | | 57/247 |
| 7,166,952 | B2 * | 1/2007 | Topliss | H10N 30/2042 |
| | | | | 310/368 |
| 7,217,244 | B2 * | 5/2007 | Suzuki | A61B 5/02444 |
| | | | | 600/481 |
| 7,770,473 | B2 * | 8/2010 | Von Lilienfeld-Toal | |
| | | | | G01L 1/205 |
| | | | | 73/862.68 |
| 8,661,915 | B2 * | 3/2014 | Taylor | G01L 1/18 |
| | | | | 73/862.041 |
| 8,943,908 | B2 * | 2/2015 | Liu | A61B 5/1118 |
| | | | | 73/172 |
| 9,655,549 | B2 * | 5/2017 | Gavish | G01L 1/146 |
| 9,671,297 | B2 * | 6/2017 | Sibbett | G06F 3/045 |
| 10,347,815 | B1 * | 7/2019 | Sleator | B25J 19/028 |
| 10,399,286 | B2 * | 9/2019 | Jia | G02B 6/02057 |
| 10,760,983 | B2 * | 9/2020 | Biesheuvel | G01L 1/18 |
| 10,989,612 | B2 * | 4/2021 | Lebental | G01L 1/205 |
| 11,150,147 | B2 * | 10/2021 | Horter | G01L 1/146 |
| 11,412,609 | B2 * | 8/2022 | Edmundson | H05K 1/0393 |
| 11,575,082 | B2 * | 2/2023 | Tajitsu | H10N 30/802 |
| 11,647,675 | B2 * | 5/2023 | Tanimoto | H10N 30/60 |
| | | | | 310/338 |
| 12,219,877 | B2 * | 2/2025 | Han | A61B 5/4806 |
| 2015/0280102 | A1 * | 10/2015 | Tajitsu | G06F 3/0414 |
| | | | | 310/338 |
| 2017/0089782 | A1 * | 3/2017 | Hirt | A61B 5/681 |
| 2019/0016065 | A1 | 1/2019 | Jia et al. | |
| 2019/0273199 | A1 * | 9/2019 | Tajitsu | D04B 1/16 |
| 2021/0351337 | A1 | 11/2021 | Ogasahara et al. | |
| 2024/0254666 | A1 * | 8/2024 | Tsuji | D04B 21/14 |

FOREIGN PATENT DOCUMENTS

| | | | |
|---|---|---|---|
| JP | 04-261693 | A | 9/1992 |
| JP | 3006998 | B2 | 2/2000 |
| JP | 2002-122496 | A | 4/2002 |
| JP | 2002-203996 | A | 7/2002 |
| JP | 2002350250 | A * | 12/2002 |
| JP | 2008-151638 | A | 7/2008 |
| JP | 2017-120885 | A | 7/2017 |
| JP | 2018-080417 | A | 5/2018 |
| JP | 2018-173292 | A | 11/2018 |
| JP | 6501958 | B2 | 4/2019 |
| JP | 2020-065671 | A | 4/2020 |

* cited by examiner

FIG. 6
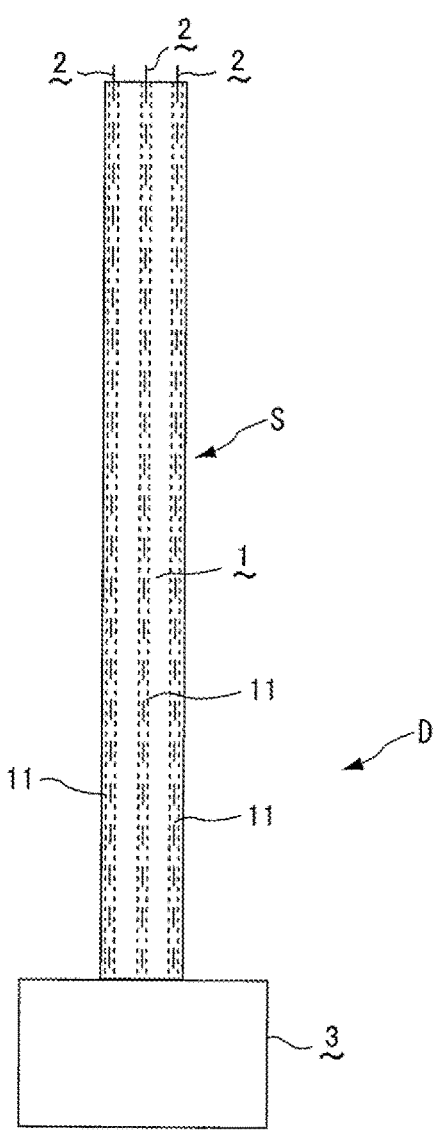
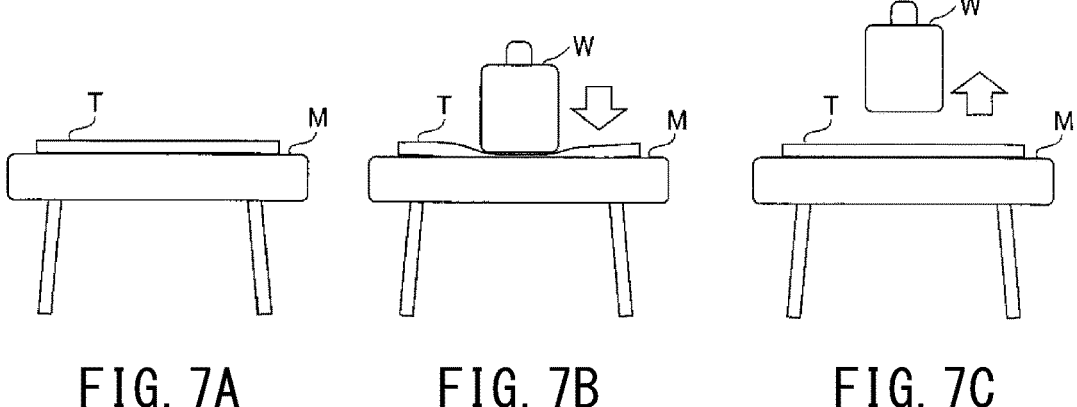
FIG. 7A          FIG. 7B          FIG. 7C

Comparative Example 1        Comparative Example 2

FABRIC-TYPE SENSOR INCLUDING FABRIC BASE MATERIAL AND A LINE-SHAPED SENSOR ELEMENT AND FABRIC-TYPE SENSOR DEVICE

CROSS REFERENCE TO RELATED APPLICATIONS

This application is a National Stage of International Application No. PCT/JP2022/004013 filed on Feb. 2, 2022, claiming priority based on Japanese Patent Application No. 2021-028013 filed on Feb. 24, 2021.

TECHNICAL FIELD

The present invention relates to a fabric-like sensor and a fabric-like sensor device used in various detecting devices.

BACKGROUND ART

A fabric-like sensor (sensor of fabric-like form) has been used as a face pressure-sensitive sensor or a shape change sensor that detects the presence or absence of contact and shape change by attaching it to a target face of bedding or clothing or the like. Further, as such the fabric-like sensor, a line-shaped sensor element has been known which is woven into a fabric and integrated therewith (see, for example, Patent Documents 1 to 3).

However, in the conventional fabric-like sensor, since not only was the line-shaped sensor element constrained by a ground yarn of the fabric, but the sensor element itself was also wavy shaped due to that it was woven into the fabric, there was a problem that an influence that was caused by any signal other than a target electrical signal from the sensor element was significant when the fabric-like sensor was deformed and thus an output of the electrical signal was reduced.

Further, in the conventional fabric-like sensor, since the line-shaped sensor element was in a state of being exposed to the outside, there was also a drawback that the sensor element was easily damaged when any hard object came into contact with the fabric-like sensor. In addition, when an elasticity was imparted to the fabric in which the line-shaped sensor element was woven, there was a risk of disconnection of the sensor element due to an application of a load in the pulling direction to the sensor element constrained by the ground yarn.

On the other hand, in the field of decorative fabric, a technique of providing a cavity portion in the structure of the raw woven fabric and inserting a decorative yarn in the cavity portion was also conventionally known (see Patent Document 4). However, this technique was just a technique related to decorative fabrics attached to clothes and automobile seats, or the like and any fabric-like sensor to which this type of technique was applied was not known.

PRIOR ART DOCUMENTS

Patent Documents

Patent Document 1; Japanese Patent Laid-Open No. 2002-203996
Patent Document 2; Japanese Patent Laid-Open No. 2017-120885
Patent Document 3; Japanese Patent Laid-Open No. 2018-173292
Patent Document 4; Japanese Patent No. 3006998

SUMMARY OF THE INVENTION

Technical Problem

An object of the present invention is to solve the problem of the prior arts, and in summary, to provide the fabric-like sensor in which an output signal can be improved when in use and damage or fracture of a sensor element hardly occurs, and a fabric-like sensor device using it.

Solution to Problem

In the fabric-like sensor based on conventional technology in which the conventional sensor element was woven into the fabric, +(plus) and −(minus) output signals were generated simultaneously within a narrow range due to local expansion and contraction of the sensor element constrained by the ground yarn, and this noise signal and the target signal were thereby canceled by + and −, which caused a risk of output loss.

Therefore, in a fabric-like sensor S having a fabric base material 1 and a line-shaped sensor element 2, the present inventors provided at least one line-shaped cavity portion 11 inside the fabric base material 1, and made at least a part of the cavity portion 11 of a raw fabric having no elasticity in a line direction of the cavity portion 11, and further arranged the line-shaped sensor element 2 in at least one of cavity portions 11 in a fabric 1 in a state of not being substantially constrained or fixed (see FIG. 1).

Further, according to the present invention, providing a plurality of cavity portions for the fabric base material 1 and arranging the line-shaped sensor element 2 in all cavity portions, detection accuracy of the fabric-like sensor S can be improved.

Further, according to the present invention, using a piezo-electric sensor for at least one of the line-shaped sensor elements 2, the fabric-like sensor S can be suitably used as a face pressure-sensitive sensor or a shape change sensor.

Further, according to the present invention, composing a non-cavity portion of the fabric base material 1 from a single structure and forming the cavity portion from a double structure (bag-shaped structure) using a grand yarn of the single structure of the non-cavity portion, the fabric-like sensor S face can be flattened.

Further, according to the present invention, providing an elastomer material on at least one face of the front and back faces of a region of the fabric base material in which the cavity portion is formed, a non-slip effect can be obtained when the fabric-like sensor S is placed on the target face.

Further, according to the present invention, the raw fabric face can be flattened by using the elastomer material for a part of the raw fabric composing the fabric base material 1.

Further, according to the present invention, a fabric-like sensor device can be also composed by connecting a signal processing device 3 to the fabric-like sensor S.

Advantageous Effects of the Invention

According to the present invention, providing the line-shaped cavity portion inside the fabric base material, and composing the fabric-like sensor such that a line-shaped sensor element is arranged in the cavity portion in a state of not being constrained or fixed to the fabric, no noise signal is generated in the line-shaped sensor element, so that a target electrical signal can be output without loss even if the fabric-like sensor is deformed when in use. Also, this makes it possible to improve the detection accuracy of the fabric-like sensor.

Further, in the fabric-like sensor of the present invention, since the line-shaped sensor element in the cavity portion becomes to be covered with the fabric base material, detection can be performed in a state of non-contacting with the target face on which the fabric-like sensor is placed or any substance which would deform the fabric-like sensor, damage to the line-shaped sensor element can be also prevented. In addition, using the raw fabric having no elasticity in the line direction of the cavity portion for the fabric base material, also any load in the pulling direction is not applied to the line-shaped sensor element, so that the line-shaped sensor element can be also prevented from being disconnected.

BRIEF DESCRIPTION OF THE DRAWINGS

FIG. 6 is a perspective view of the whole of a fabric-like sensor device of a second embodiment of the present invention.

FIGS. 7A to 7C are explanatory views for explaining a verification test on effects of the present invention.

DESCRIPTION OF PREFERRED EMBODIMENTS

First Embodiment

Embodiments for carrying out the present invention will be described in more detail based on the drawings specifically illustrating them as follows.

"Composition, Usage, and Manufacturing Method of a Fabric-Like Sensor"

[1] Regarding a Basic Composition of a Fabric-Like Sensor

Figure 1:
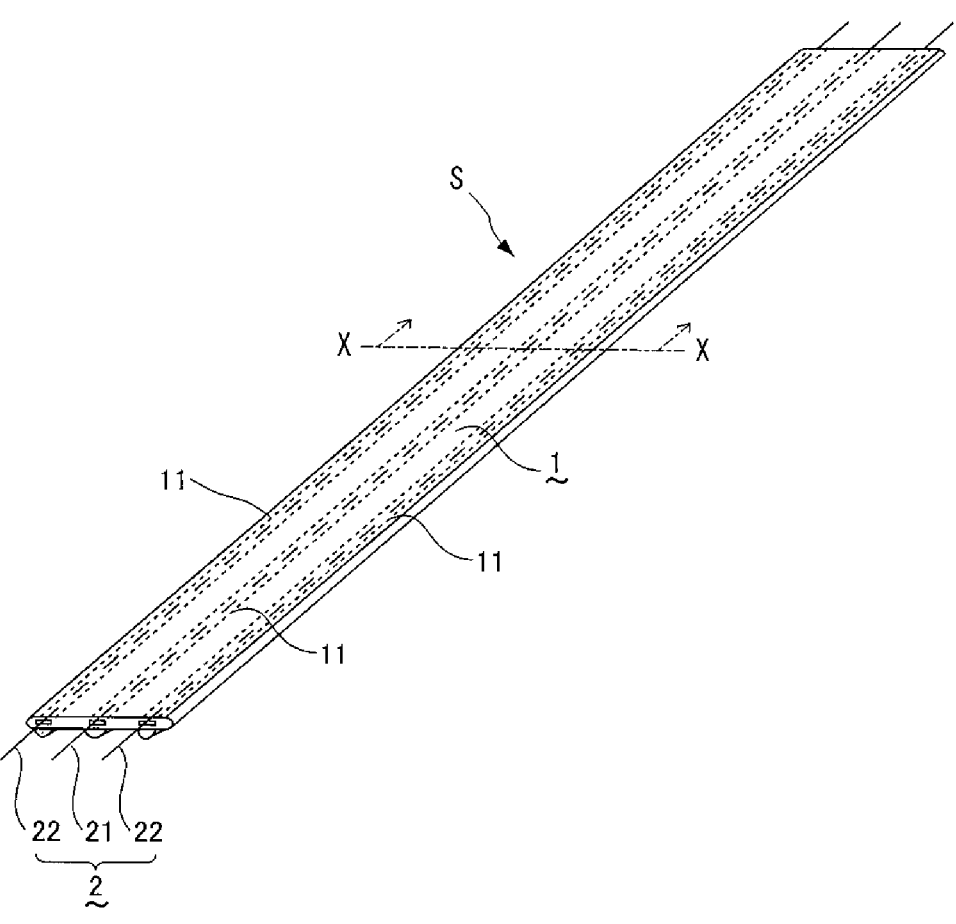
FIG. 1 is a perspective view of whole of a fabric-like sensor of a first embodiment of the present invention and Practical Example 2 as viewed from the front side.
Figure 2:
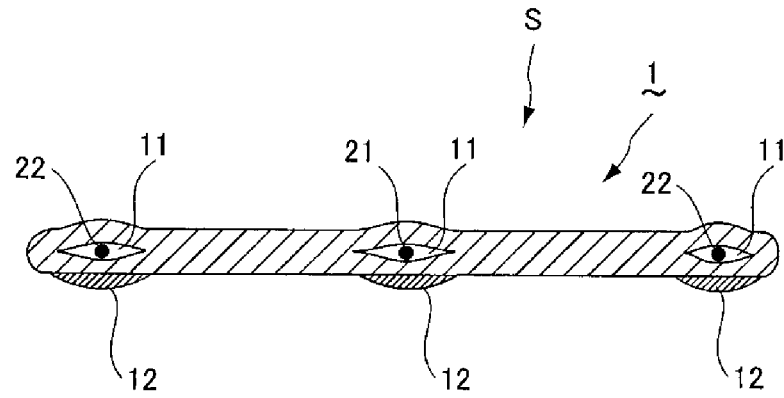
FIG. 2 is an enlarged view of a cross-section along X-X of the fabric-like sensor of the first embodiment of the present invention and Practical Example 2 for explaining a state of the cross-section.

The basic composition of the present embodiment will be described based on FIGS. 1 to 5. In the present embodiment, as shown in FIGS. 1 and 2, a fabric-like sensor S is composed, for a strip-shaped fabric base material 1 having a plurality of line-shaped cavity portions 11 inside, such that a line-shaped sensor element 2 is arranged in each cavity portion 11 in a state of not being constrained or fixed to the fabric base material 1. Further, for the fabric base material 1, a raw fabric having no elasticity in a line direction of the cavity portion 11 (in a length direction of the strip-shaped fabric base material 1) is used, and cavity portions 11 are formed in three rows at the center and both ends of the fabric base material 1. Further, a piezoelectric sensor 21 is used as the line-shaped sensor element 2 for arranging in the cavity portion 11 at the center of the fabric base material 1, and a capacitive displacement sensor 22 is used as the line-shaped sensor element 2 for arranging in the cavity portions 11·11 at both ends.

It should be noted that the "a state of not being constrained or fixed to "refers to an unconstrained state in which the ground yarn or thread of the fabric base material 1 is not crossed or entangled above and below the line-shaped sensor element 2, or the line-shaped sensor element 2 is not fixed to the fabric base material 1 with an adhesive, a thermally fusible yarn, or the like, and means a state that the line-shaped sensor element 2 is free in the cavity portion 11 at least in the line direction of it. However, this state is enough to be a substantially unconstrained or un-fixed state, and includes, for example, a state in which the line-shaped sensor element 2 is not constrained on most of target faces (measurement faces) of the fabric-like sensor S and several places are locally fixed. Further, it is preferable that the line-shaped sensor element 2 is arranged leaving a spatial margin (a state having a movable space) in the cavity portion 11.

[2] Regarding a Method of Using the Fabric-Like Sensor

Next, the method of using the fabric-like sensor S will be described. The fabric-like sensor S is arranged on the flexible target face, to apply a vertical load to the target face from the top of the fabric-like sensor S. At that time, electrical energy that is generated when the line-shaped sensor element 2 receives a bending load and is deformed in accordance with the target face is output to the end of the line-shaped sensor element 2 as an electrical signal. Then, the presence or absence of deformation of the target face and a magnitude of the deformation can be detected through an arithmetic processing performed by a signal processing device connected to the fabric-like sensor S to which the electrical signal output from the line-shaped sensor element 2 is input.

Further, at the above, since, in the fabric-like sensor S of the present embodiment, the line-shaped sensor element 2 is arranged in a state of not being constrained or fixed to the fabric base material 1, a noise, a cancellation, and an attenuation of the electrical signal can be suppressed, which would result in improvement of an output of electrical signal and enhancement in detection accuracy of the fabric-like sensor S. Further, using the raw fabric having no elasticity in the line direction of the cavity portion 11 (in other words, in a length direction of the line-shaped sensor element 2 arranged in the cavity portion 11) for the fabric base material 1, the line-shaped sensor element 2 is difficult to receive a load in the pulling direction, thus disconnection can be also prevented even if the load in the line direction of the cavity portion 11 is applied.

[3] Regarding Fabric Base Materials

[3-1] Material

Next, each of components of the fabric-like sensor S will be described. First, regarding a material of the fabric base material 1, while a woven fabric is used in the present embodiment, a knitting fabric or a nonwoven fabric (including both wet nonwoven fabric and dry nonwoven fabric) may be also used. Further, regarding the ground yarn composing the fabric base material 1, in the present embodiment, while a polyester fiber multifilament yarn is used, but a synthetic fiber such as a nylon fiber and an acrylic fiber, a recycled fiber such as rayon and cupra, a natural fiber such as cotton and wool, or a combination thereof may be used.

Further, not only the multifilament yarn but also a spun yarn and a blended yarn may be also used. Further, the same fiber raw material may be used when a nonwoven fabric is used for the fabric base material 1 as well.

Further, in the present embodiment, while the raw fabric having no elasticity is used for the entire fabric base material 1, the raw fabric having no elasticity can be also used for a part of the cavity portion 11. In the present specification, "raw fabric having no elasticity" means a raw fabric having an elongation modulus of 5% or less in the B-1 method (fixed loading method) of JIS L 1096. Further, in the present embodiment, in order to suppress the noise of the electrical signal, while the raw fabric having no elasticity in the direction perpendicular to the line direction of the cavity portion 11 (in a width direction of the strip-shaped fabric base material 1) is used for the fabric base material 1, it is also possible to use the raw fabric having no elasticity only in the line direction of the cavity portion 11.

[3-2] Structure

Further, in the present embodiment, as a structure of the fabric base material 1, while a plain-weave-structure is adopted for the fabric base material 1, not only the plain-weave-structure but also a twill-woven structure, a sateen-woven structure, and woven structures composed of deformed structures of these structures can be also adopted for the structure of the fabric base material 1. Further, when the knitting fabric is used for the fabric base material 1, a weft knitted structure composed of a flat knitted structure, a rubber knitted structure, a purl stitched structure and deformed structures of these structures, or a warp knitted structure composed of tricot knitted structure, Russell knitted structure, Milanese knitted structure and deformed structures of these structures may be selected to adapt as the structure.

[3-3] Shape

Further, in the present embodiment, while a strip-shaped raw fabric is used for the accurate detection of the fabric base material 1, a shape of the fabric base material 1 may be changed appropriately, for example, to a wide sheet shape or a branched shape, or the like, according to a shape of the target face and a detection range. Further, regarding a thickness of the fabric base material 1 as well, in the present embodiment, while it is formed to be 0.1 to 2.0 mm to ensure flexibility and tensile strength in the bending direction, it may be appropriately changed according to the magnitude of load to be detected or uses, etc.

[3-4] Cavity Portion

Figure 3:
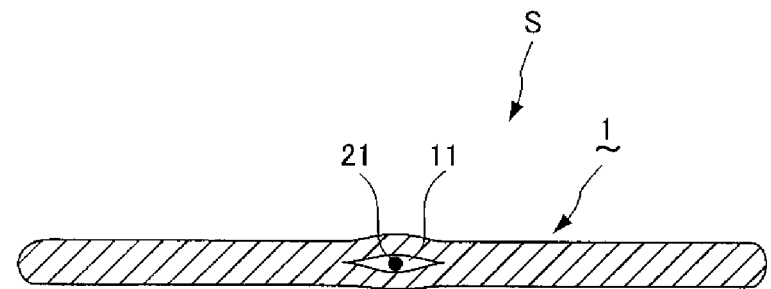
FIG. 3 is an enlarged view of cross-section of a fabric-like sensor of the modified embodiment and Practical Example 1 for explaining a state of the cross-section.

Further, in the present embodiment, as shown in FIG. 2, while three rows of cavity portions 11 are formed at the center and both ends of the fabric base material 1, the number and arrangement of the cavity portions 11 may be appropriately changed, only one cavity portion 11 may be also formed as shown in FIG. 3. Further, regarding the line shape of the cavity portion 11, while it is formed in a straight line in the present embodiment, it may be formed in a curved line, or may be formed into a shape that combines the straight line and the curve. Further regarding a size of the cavity portion 11, in order to facilitate insertion of the line-shaped sensor element 2, while it is enough to be larger than the diameter of the line-shaped sensor element 2 at a state of the maximized cross-sectional area of the cavity portion 11, it is preferable that the maximized cross-sectional area of the cavity portion 11 is 1.1 times or more and 1000 times or less than the cross-sectional area of the line-shaped sensor element 2.

[3-5] a Method for Forming the Cavity Portion

Figure 4:
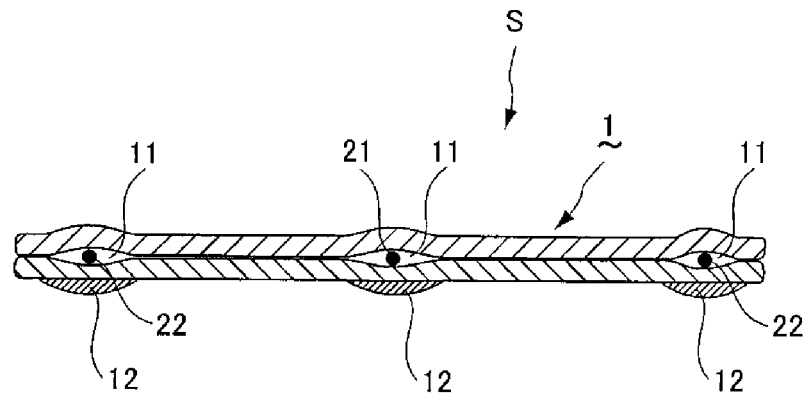
FIG. 4 is an enlarged view of a cross-section of a fabric-like sensor of a modified embodiment of the present invention for explaining a state of the cross-section.

Further, regarding the method for forming the cavity portion 11, in the present embodiment, in order to flatten a raw fabric face, for example as shown FIG. 2, a non-cavity portion of the fabric base material 1 is composed of a single structure, then the cavity portion 11 is formed from a double structure (bag-shaped structure) using the ground yarn of the single structure of this non-cavity portion, but, for example as shown in FIG. 4, composing the fabric base material 1 of a multiple woven structure, a region that is not partially connected between layers may be formed as the cavity portion 11. Further when it is not necessary to flatten the raw fabric face, the cavity portion 11 may be also formed by making a bag-shaped structure partially by a separate yarn different from the ground yarn of the fabric base material 1

As for another method for forming the cavity portion 11, in the woven fabric, the knitting fabric or the nonwoven fabric, such methods as a method in which the bag-shaped structure is formed on the raw fabric face separately from the ground structure, a method in which two pieces of the raw fabric are bonded together with the adhesive or heat fusion to form the cavity portion 11 by a portion that is not partially bonded together, and a method in which two pieces of raw fabric are sewed in the line direction of the cavity portion 11 to form the cavity portion 11 between the sewing portions may also be employed.

Further, also when the knitting fabric is used for the fabric base material 1 instead of the woven fabric, composing the non-cavity portion of the single structure of the fabric base material 1, the cavity portion 11 may be formed from the double structure (bag-shaped structure) using the ground yarn of the single structure of this non-cavity portion. In addition, composing the fabric base material 1 of a multiple knitted structure, the region that is not partially connected between layers may be formed as the cavity portion 11. Also in this case, the raw fabric face can be flattened as with the cavity portion 11 of the woven structure. Further, the fabric base material 1 may be also composed by connecting three or more face structures or by laminating and integrating three or more raw fabrics, in which case a plurality of cavity portions 11 may be formed between different layers.

[3-6] Non-Slip Portion

Figure 5:
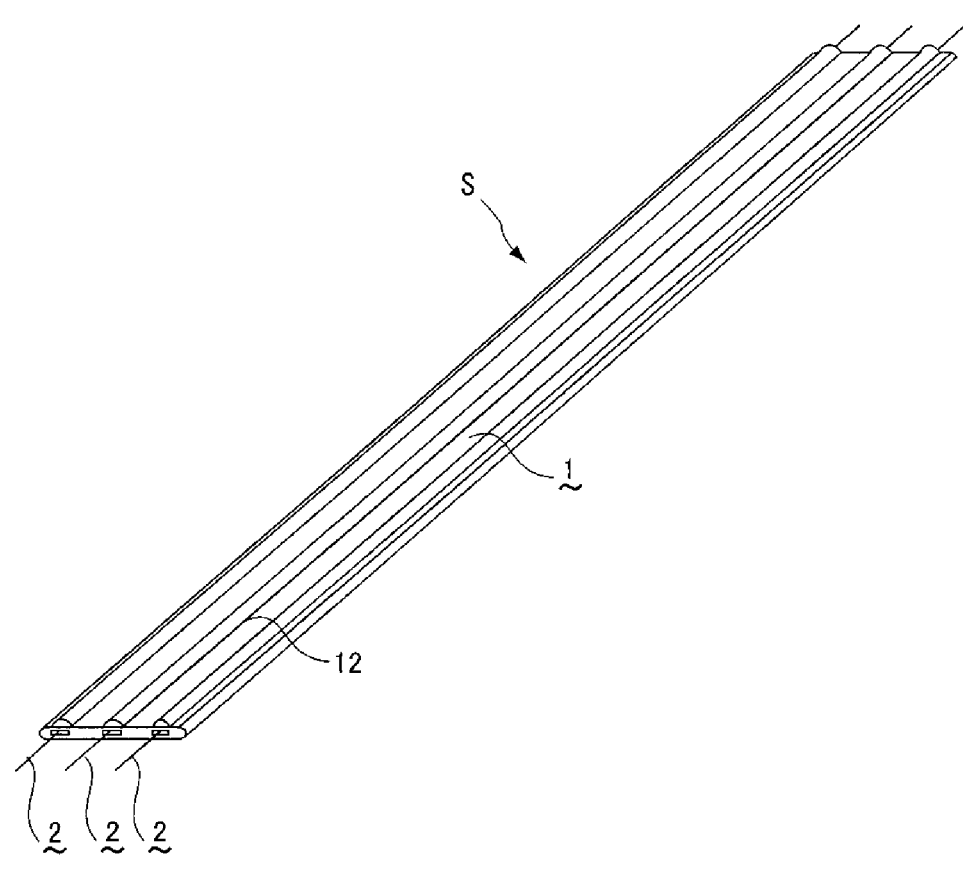
FIG. 5 is a perspective view of whole of the fabric-like sensor of the first embodiment of the present invention as viewed from the back side.

Further in the present embodiment, as shown in FIG. 5, a plate-shaped non-slip portion 12 composed of an elastomer material and having laterally long and semi-elliptical cross-sectional shape is formed on a back face side of a region forming the cavity portion 11 of the fabric base material 1. Thereby, even if a force is applied laterally (in a direction parallel to the target face) when the fabric-like sensor S is arranged on the target face, the position of the fabric base material 1 can be suppressed from being deviated. Further, since the elastomer material having flexibility against a load in the bending direction is used in the non-slip portion 12, there is no concern as well that the detection accuracy of the fabric-like sensor S is impaired. It should be noted that the thickness of the non-slip portion 12 is preferably in the range of 0.1 to 5 mm to ensure flexibility in the bending direction.

Further, as the elastomer material, while silicone rubber is used in the present embodiment, thermoplastic elastomer such as polyolefin, polystyrene, vinyl chloride, polyurethane, and polyester can be also used, and thermosetting elastomers such as urethane rubber and fluorine rubber other than silicone rubber can be also used. Further, as the elastomer material, a soft resin such as vinyl chloride resin to which flexibility is imparted with a plasticizer can be also used.

Further, in the present embodiment, while the non-slip portion 12 is formed only on the back face of the fabric base material 1, it may be also formed on both the front face or the front and back face. In the present embodiment, since, forming the plate-shaped non-slip portion 12 in accordance with the width of the cavity portion 11, the non-slip portion 12 is enabled to work as a reinforcing material to hold the width of the cavity portion 11, and, a deformation of the cavity portion 12 (for example, floating of the face layer due to a contraction of a width of the cavity portion 11, or the like) can be suppressed, and the line-shaped sensor element 2 can be maintained in a state of being put between the front face layer and the back face layer forming the cavity portion 11.

Further, in the present embodiment, while the non-slip portion 12 is formed in a plate shape, when the elastomer material is integrated with the fabric base material 1 in a state of being exposed to the outside, a point-shaped, a linear, a rod-shaped, or a sheet-like form may be also employed. Further, the cross-sectional shape of the non-slip portion 12 may be also appropriately changed. Further, in the present embodiment, while the non-slip portion 12 is integrated with the fabric base material 1 without going through an adhesive layer, it can be also integrated through the adhesive layer.

[3-7] Modified Example of the Non-Slip Portion

Further, regarding the non-slip portion 12 of the fabric base material 1, a rubber yarn (elastic yarn) using the elastomer material may be also used, in which case, incorporating the elastomer material as an insertion yarn into the woven structure or knitted structure of the fabric base material 1 and exposing the elastomer material to the outside of the front face layer or the back face layer composing the cavity portion 11, a non-slip effect can be obtained. Further, providing the elastomer material as part of the raw fabric composing the fabric base material 1 in this way, the back face side of the fabric-like sensor S can be flattened, and post-processing for forming the non-slip portion 12 can be also omitted.

[4] Regarding the Line-Shaped Sensor Element

[4-1] Types of the Sensor Element

Further, regarding the line-shaped sensor element 2, in the present embodiment, while the wire-shaped piezoelectric element described in Japanese Patent No. 6501958 is used as the piezoelectric sensor 21, a polylactic piezoelectric fiber and other fibrous piezoelectric element may be used as the piezoelectric sensor 21. Further, a copper wire used as the capacitive displacement sensor 22 as well as a component thereof is arranged in the cavity portion 11 of the fabric base material 1. Further, sensor elements other than the piezoelectric sensor 21 and the capacitive displacement sensor 22 may be used, and for example, a strain wire sensor, a temperature sensor, or the like may be used. However, it is preferable to use at least one or more piezoelectric sensors 21 for the line-shaped sensor element 2.

[4-2] Arrangement of Sensor Element

Further, in the present embodiment, while the line-shaped sensor element 2 is arranged in all cavity portions 11 formed in the fabric base material 1 in order to improve the detection accuracy, it can be enough to arrange in at least one cavity portion 11 as necessary and may be also arranged in a part of the cavity portion 11 instead of the entire portion. Further, a plurality of line-shaped sensor elements 2 may be arranged in one cavity portion 11. Further, the line-shaped sensor element 2 may be used having a cross-sectional area smaller than the maximized cross-sectional area of the cavity portion 11.

"Method for Manufacturing the Fabric-Like Sensor"

Next, a method for manufacturing the fabric-like sensor S will be described. In the present embodiment, when the fabric base material 1 is woven by a loom, weaving is performed while inserting the line-shaped sensor element 2 into a position of the cavity portion 11. At this time, by adjusting a position and a region of a connecting structure of the front face layer and the back face layer of the fabric base material 1, the cavity portion 11 having a predetermined size can be easily formed. Further, the non-slip portion 12 is formed integrally with the fabric base material 1 by dripping liquid or pasty silicone rubber on the back face side and heating and curing without using the adhesive, while moving the woven fabric base material in the length direction by a conveyor. The fabric-like sensor S can be thereby manufactured efficiently.

Further, when the knitting fabric is used for the fabric base material 1, when knitting the fabric base material 1 with a knitting machine, by knitting while inserting the line-shaped sensor element 2 into a position of the cavity portion 11, the fabric-like sensor S can be efficiently manufactured. Further, when raw fabrics such as woven fabrics, knitting fabrics, and nonwoven fabrics are bonded or sewn while overlying two sheets to form the fabric base material 1, by performing bonding and stitching in a state of the line-shaped sensor element 2 being arranged between the raw fabrics, the fabric-like sensor S can be also manufactured efficiently. On the other hand, the fabric-like sensor S can be also manufactured by first producing the fabric base material 1 and then inserting the line-shaped sensor element 2 into the cavity portion 11.

Further, regarding to the non-slip portion 12 of the fabric base material 1, the elastomer formed in a plate-shape or a rod-shape can be bonded to and integrated with the front face side or the back face side of the fabric base material 1 with the adhesive or the like. Further, when the thermoplastic elastomer is used, it can be integrated by heat fusion using heat pressing or the like. Further, when the rubber yarn is used as the elastomer of the non-slip portion 12, it can be integrated with the fabric base material by using it as the insertion yarn when weaving or knitting the fabric.

"Modified Example of Fabric-Like Sensor"

In the present embodiment, while the composition in which the line-shaped sensor element 2 is arranged in at least one of the cavity portions 11 is disclosed, any line-shaped object other than the line-shaped sensor element 2 may be arranged in the cavity portion 11 as long as the effect of the present invention is not impaired. Resin or metal tubes, metal wires, optical fibers, magnetic cords, or the like are given as specific examples. For example, in the case of a resin or metal tube, when the line-shaped sensor element 2 is arranged in the tube, by protecting the line-shaped sensor element 2, durability, water resistance, oil resistance, or the like of the fabric-like sensor can be thereby improved, and in the case of a metal wire, shape-imparting characteristics can be imparted to the fabric-like sensor.

Second Embodiment

"Composition and Uses of Fabric-Like Sensor Device"

[1] Regarding Basic Composition of Fabric-Like Sensor Device

The basic composition of the present embodiment will be described below with reference to FIG. 6. The present embodiment is composed such that, using the fabric-like sensor S of the first embodiment, the signal processing device 3 is connected to one end of the line-shaped sensor element 2 of this fabric sensor S. Since the electrical signal output from the line-shaped sensor element 2 to the signal processing device 3 when the fabric-like sensor S is deformed can be thereby amplified, filtered, signal converted and so on through an analog signal processing or a digital signal processing, a control signal corresponding to the electrical signal from the line-shaped sensor element 2 can be output to a control unit of an external device. It should be noted that a connection between the signal processing device 3 and the external device may be a wired connection or a wireless connection.

[2] Regarding Signal Processing Device

Further, regarding the signal processing device 3, while it comprises an input part, an arithmetic processing part, a storage part and an output part, and comprises a signal processing program capable of processing electrical signals output from the piezoelectric sensor and the capacitive displacement sensor used as the line-shaped sensor element 2 in the storage part, it is necessary to store the signal processing program corresponding to various sensors in the storage part, when a strain wire sensor, a temperature sensor, or the like are used for the line-shaped sensor element 2.

[3] Regarding Uses of the Fabric-Like Sensor

The fabric-like sensor S can usually be available for various known sensors, and, for example, can be used as posture grasping sensors such as detection sensors of turning over in bed and seating sensors, pressure sensors, displacement sensors, deformation sensors, vibration sensors, biometric sensors, acceleration sensors, contact sensors, impact sensors, security sensors, or the like.

Further, objects to which the fabric-like sensor S is attached include, depending on the various sensors, for example, beddings such as beds and futons, vehicle seats such as car seats and aircraft seats, seating furniture such as sofas and chairs, interior accessories such as cushions and floor cushions, linens such as towels and sheets, safety and disaster prevention supplies such as helmets and hoods, rugs such as carpets and mats, medical and hygiene products such as supporters and masks, toys such as stuffed toys and rubber balls, building materials such as flooring and wall materials, and various equipment such as home electric appliances and industrial machinery. Further, regarding an attaching method of the fabric-like sensor S, it is enough to just place it on an object, or it can be also fixed to the object by sewing or pinching, adhesive tape or hook-and-loop fastener, or the like.

PRACTICAL EXAMPLE

[Verification Test of Effect]

Next, a verification test of the effect of the present invention will be described below. In the present test, several types of fabric-like sensors each using a piezoelectric sensor as a line-shaped sensor element were fabricated in different compositions, and magnitudes of the output of the piezoelectric signals when the fabric-like sensors were deformed were evaluated for each sample (Practical Examples 1 to 2 and Comparative Examples 1 to 2 below).

<Method for Output-Evaluation Test of the Piezoelectric Signal>

First, as shown in FIG. 7A, a sample T of the fabric-like sensor of a length of 30 cm is placed on a seat M of a chair, an end of a sample T is connected to the signal processing device, and this signal processing device is connected to an oscilloscope (Pco Technology, Picoscope2204A). This signal processing device amplifies an electrical signal about 4000 times by an analog amplifier circuit, converts this amplified signal into a digital signal, and outputs it to the oscilloscope. In addition, the oscilloscope displays a generated output (mVp-p) of the piezoelectric signal measured when being connected to a personal computer on a monitor.

Figure 8:
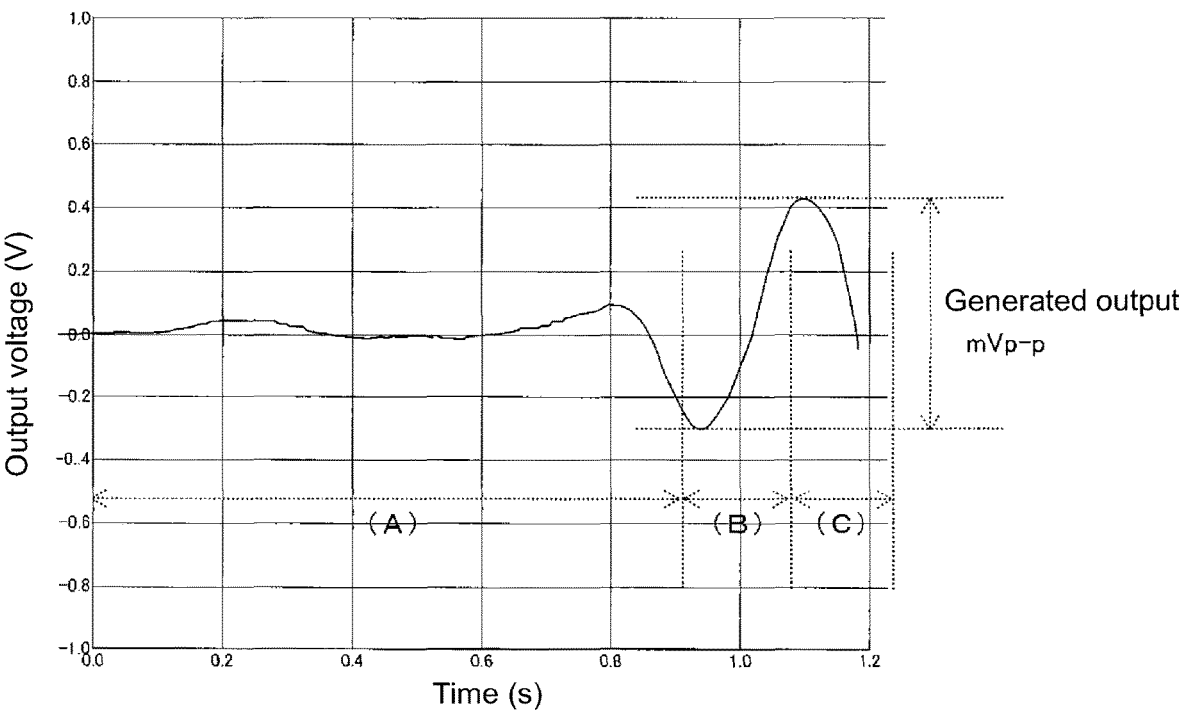
FIG. 8 is an explanatory view for explaining the verification test of the effects of the present invention.

After completion of the preparation, as shown in FIG. 7B, a weight W of 1 kgf is placed on the center of the sample T, and the weight W is immediately lifted and separated from the sample T as shown in FIG. 5C. A change at this time in the output of the piezoelectric signal due to the deformation of the sample T is measured by the oscilloscope. In addition, the output of the piezoelectric signal is displayed graphically on the monitor of the personal computer as shown in FIG. 8, and a deviation of a negative output voltage when the weight W is placed on the sample T and a positive output voltage when the weight W is lifted is measured as the generated output (mVp-p).

Practical Example 1

In the present Practical Example, a fabric base material 1 composed of a plain-weave-structure using polyester yarn as a ground yarn was formed in a strip of 50 mm wide, 1 mm thick, 30 cm long, and one cavity portion 11 was provided at the center of the width direction of the fabric base material 1, and further a fabric-like sensor S was manufactured without providing a non-slip portion on the face of the raw fabric (see FIG. 3). In addition, a non-cavity portion of the fabric base material 1 was composed of a single structure, and the cavity portion 11 was formed from a double structure using the ground yarn of the single structure of the non-cavity portion. In addition, a width of the cavity portion 11 of the fabric base material 1 (width in a state of being in a slit-like shape before inserting into the line-shaped sensor element 2) was set at 5 mm, and the piezoelectric sensor 21 (wire-shaped piezoelectric element) with the diameter of 0.35 mm described in Japanese Patent No. 6501958 was inserted into and arranged in the cavity portion 11. And, when an output voltage of the piezoelectric signal was measured using the sample of the present Practical Example, the measured value was 1230 mV p-p.

Practical Example 2

In the present Practical Example, forming the fabric base material 1 composed of a plain-weave-structure using polyester yarn as the ground yarn in a strip-shape of 50 mm wide and 1 mm thick, and providing three cavity portions in the center and both sides of the width direction of the fabric base material 1, the fabric-like sensor was manufactured (see FIG. 2). Further, plate-shaped non-slip portions 12 each composed of an elastomer material and having laterally long and semi-elliptical cross-sectional shape is formed on the back face of each cavity portion 11 of the fabric base material 1. In addition, the non-cavity portion of the fabric base material 1 was composed of the single structure, and the cavity portion 11 was formed from the double structure using the ground yarn of single structure of the non-cavity portion. Further, the width of the cavity portion 11 of the fabric base material 1 (the width in the state of a slit-like shape before inserting into the line-shaped sensor element 2) was set at 5 mm, and the piezoelectric sensor 21 (wire-like piezoelectric element) with a diameter of 0.35 mm which was described in Japanese Patent No. 6501958 was inserted into and arranged in the cavity portion 11 at the center of the fabric base material 1, and copper wires for the capacitive displacement sensor 22 each with a diameter of 0.5 mm were inserted and arranged in the cavity portions 11·11 at both ends of the fabric base material 1. And when the output voltage of the piezoelectric signal was measured using the sample of the present Practical Example, the measured value was 1221 mV p-p.

Comparative Example 1

Figure 9:
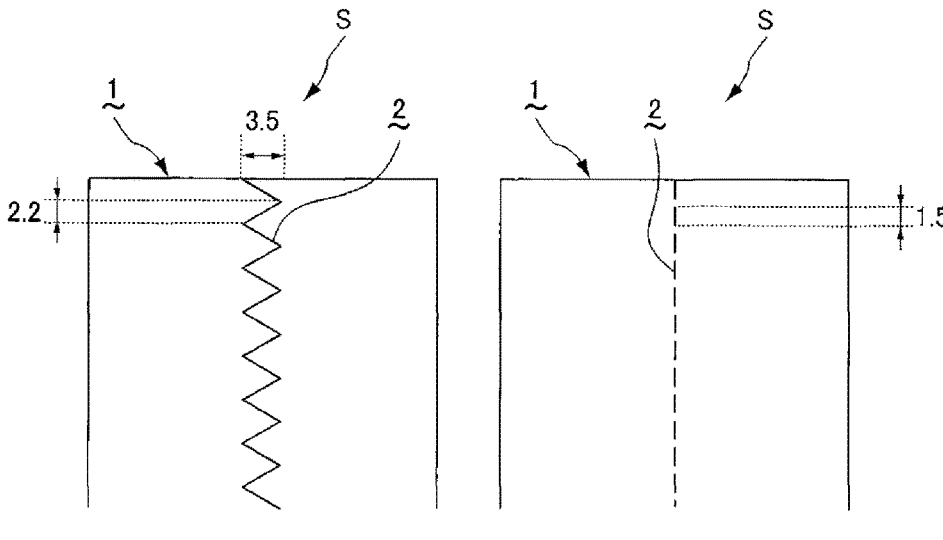
FIG. 9 is an explanatory view for explaining the verification test of the effects of the present invention.

In the present Comparative Example, the fabric base material 1 composed of twill weaving using a cotton spun yarn as the ground yarn was formed in a strip-shaped form with a width of 25 mm and a thickness of 1 mm as shown in FIG. 9. In addition, using a 30th (19.68 tex) sewing thread for a thick raw fabric as a needle thread of the sewing thread and the piezoelectric sensor 21 (wire-shaped piezoelectric element) with the diameter of 0.35 mm described in Japanese Patent No. 6501958 as the line-shaped sensor element 2 for a bobbin thread, the fabric-like sensor S was composed by performing a zigzag stitching in the length direction with respect to the center portion of the fabric base material 1 (JANOME JP210M pattern number: 08). The width of the seams was set at 3.5 mm and the roughness at 2.2 mm. And when the output voltage of the piezoelectric signal was measured using the sample of this Comparative Example, the measured value was 63 mV p-p.

Comparative Example 2

In the present Comparative Example, the fabric base material 1 composed of twill weaving using the cotton spun yarn as the ground yarn was formed in the strip-shaped form with the width of 25 mm and the thickness of 1 mm as shown in FIG. 9. In addition, using a 30th (19.68 tex) sewing thread for a thick raw fabric as the needle thread of the sewing thread and the piezoelectric sensor 21 (wire-shaped piezoelectric element) with the diameter of 0.35 mm described in Japanese Patent No. 6501958 as the line-shaped sensor element 2 for the bobbin thread, the fabric-like sensor S was composed by performing a straight stitching in the length direction with respect to the center portion of the fabric (JANOME JP210M pattern number: 08). The roughness was at 1.5 mm. And when the output voltage of the piezoelectric signal was measured using the sample of this Comparative Example, the measured value was 312 mV p-p.

<Summary of Test Results>

From the tests, it can be confirmed that piezoelectric signal output voltages of the samples of Practical Examples 1 to 2 in which piezoelectric sensors were arranged in the cavity portions of the fabric base material were larger than those of the samples of Comparative Example 1 to 2 in which the piezoelectric sensors were incorporated into the structure as the stitching thread. Further, it was confirmed that, in Practical Example 2 having the non-slip portion as well, the same output as in Practical Example 1 without the non-slip portion can be obtained. A table summarizing the test results is shown below.

TABLE 1

| Unit: mVp-p | | | | |
| --- | --- | --- | --- | --- |
| | Ave | n = 1 | n = 2 | n = 3 |
| Practical Example 1 | 1230 | 1258 | 1194 | 1237 |
| Practical Example 2 | 1221 | 1183 | 1230 | 1249 |
| Comparative Example 1 | 63 | 55 | 68 | 66 |
| Comparative Example 2 | 312 | 332 | 296 | 307 |

REFERENCE SIGNS 1 fabric base material
11 cavity portion
12 non-slip portion
2 line-shaped sensor element
21 piezoelectric sensor
22 capacitive displacement sensor
3 signal processing device
S fabric-like sensor
D fabric-like sensor device

The invention claimed is:

1. A fabric-based sensor comprising:
a fabric base material; and
a line-shaped sensor element, wherein the fabric base material comprises at least one line-shaped cavity portion inside and is composed of a raw fabric at least a part of the cavity portion has no elasticity in a line direction of the cavity portion, and
wherein the line-shaped sensor element is arranged in a state of not being constrained or fixed in the at least one of cavity portions in the fabric base material, and
wherein a non-cavity portion of the fabric base material is made of a single woven structure or a single knitted structure and the cavity portion is formed of a double structure using a ground yarn of the single structure of the non-cavity portion.

2. The fabric-based sensor according to claim 1, wherein the fabric base material comprises a plurality of cavity portions, the line-shaped sensor element is arranged in all the cavity portions.

3. The fabric-based sensor according to claim 1, wherein at least one of line-shaped sensor elements is a piezoelectric sensor.

4. The fabric-based sensor according to claim 1 having an elastomer material on at least one face of a front and back faces of a region of the fabric base material in which cavity portion is formed.

5. The fabric-based sensor according to claim 4, wherein the elastomer material is a part of a raw fabric composing the fabric base material.

6. A fabric-based sensor device comprising: the fabric-based sensor according to claim 1; and a signal processing device.

7. A fabric-based sensor comprising:
a fabric base material;
a line-shaped sensor element,
wherein the fabric base material comprises at least one line-shaped cavity portion inside and is composed of a raw fabric at least a part of the cavity portion has no elasticity in a line direction of the cavity portion, and
wherein the line-shaped sensor element is arranged in a state of not being constrained or fixed in the at least one of cavity portion in the fabric base material, and
wherein a non-cavity portion of the fabric base material is made of a multiple woven structure or a multiple knitted structure and a region that is not partially connected between layers is formed as the cavity portion.

* * * * *